United States Patent [19]

Kingdon et al.

[11] Patent Number: 6,138,003
[45] Date of Patent: Oct. 24, 2000

[54] SYSTEM AND METHOD FOR AUTHORIZATION OF LOCATION SERVICES

[75] Inventors: Christopher H. Kingdon, Garland; Bagher R. Zadeh, Dallas; Maya Roel-Ng, Plano; Stephen Hayes, Carrollton, all of Tex.

[73] Assignee: Ericsson Inc., Research Triangle Park, N.C.

[21] Appl. No.: 08/978,910

[22] Filed: Nov. 26, 1997

[51] Int. Cl.[7] ....................................................... H04B 7/12
[52] U.S. Cl. ........................... 455/410; 455/411; 455/456; 455/38.1
[58] Field of Search .................................. 455/12.1, 31.3, 455/456, 410, 411, 414, 457, 99, 406, 38.1, 427, 428, 432, 433, 434, 440; 340/125.44, 825.49, 825.54

[56] References Cited

U.S. PATENT DOCUMENTS

| | | | |
|---|---|---|---|
| 5,485,163 | 1/1996 | Singer et al. | 342/457 |
| 5,497,412 | 3/1996 | Lannen et al. | 379/60 |
| 5,515,043 | 5/1996 | Berard et al. | 340/988 |
| 5,519,760 | 5/1996 | Borkowski et al. | 379/59 |
| 5,748,148 | 5/1998 | Heiser et al. | 342/457 |
| 5,918,159 | 6/1999 | Fomukong et al. | 455/38.1 |

FOREIGN PATENT DOCUMENTS

| | | |
|---|---|---|
| 0 600 162 A1 | 8/1993 | European Pat. Off. . |
| 92/10069 | 11/1992 | WIPO ............................. H04Q 7/04 |

OTHER PUBLICATIONS

PCT International Search Report dated Mar. 15, 1999.

*Primary Examiner*—Daniel S. Hunter
*Assistant Examiner*—Pablo N. Tran
*Attorney, Agent, or Firm*—Jenkens & Gilchrist, P.C.

[57] ABSTRACT

A telecommunications system and method is disclosed which performs authorization checks prior to allowing a location service to position a mobile terminal within a cellular network. The various checks involve ensuring that the requesting agency has authorization to request positioning of mobile terminals, determining whether positioning of mobile terminals is allowed within the cellular network that the mobile terminal is currently located in, verifying the authenticity of the identity of the mobile positioning center, ascertaining whether the mobile subscriber has allowed the requesting agency to position the mobile terminal, and confirming that all relevant criteria for positioning have been met by both the mobile subscriber and the requesting agency.

20 Claims, 5 Drawing Sheets

SYSTEM AND METHOD FOR AUTHORIZATION OF LOCATION SERVICES

BACKGROUND OF THE PRESENT INVENTION

1. Field of the Invention

The present invention relates generally to telecommunications systems and method for determining the location of a mobile terminal within a cellular network, and specifically to performing authorization checks prior to positioning the mobile terminal.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS within a cellular network has recently become important for a wide range of applications. For example, positioning services may be used by transport and taxi companies to determine the location of their vehicles. In addition, for emergency calls, e.g., 911 calls, the exact location of the mobile terminal may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital.

Currently, as can be seen in FIG. 2 of the drawings, upon a network positioning request, the Base Station System (BSS) (220 and 240) serving the MS 200 generates positioning data, which is delivered to the Mobile Switching Center (MSC) 260. This positioning data is then forwarded to a Mobile Positioning Center (MPC) 270 for calculation of the geographical location of the MS 200. The location of the MS 200 can then be sent to the application 280 that requested the positioning. Alternatively, the requesting application 280 could be located within the MS 200 itself or within the network (MSC/VLR 260).

In order to accurately determine the location of the MS 200, positioning data from three or more separate Base Transceiver Stations (210, 220, and 230) is required. This positioning data for GSM systems can include, for example, a Timing Advance (TA) value, which corresponds to the amount of time in advance that the MS 200 must send a message in order for the BTS 220 to receive it in the time slot allocated to that MS 200. When a message is sent from the MS 200 to the BTS 220, there is a propagation delay, which depends on the distance between the MS 200 and the BTS 220. TA values are expressed in bit periods, and can range from 0 to 63, with each bit period corresponding to approximately 550 meters between the MS 200 and the BTS 220. It should be understood, however, that any estimate of time, distance, or angle for any cellular system can be used, instead of the TA value discussed herein.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the mobile station 200 can be determined (with certain accuracy) by the Mobile Positioning Center (MPC) 270.

Therefore, Timing Advance (TA) values are obtained from the original (serving) BTS 220 and two neighboring (target) BTSs (210 and 230). In order for each target BTS (210 and 230) to determine a TA value, a positioning handover to each of the BTSs (210 and 230) must occur. A positioning handover is similar to an ordinary asynchronous handover. The target BTS, e.g., BTS 210, distinguishes the Positioning Handover from an ordinary handover by a new ACTIVATION TYPE in the CHANNEL ACTIVATION message. Unlike an ordinary handover, upon reception of a HANDOVER ACCESS message from the MS 200, the target BTS 210 only calculates the TA value, and does not respond to the mobile station 200, that is, no PHYSICAL INFORMATION is sent to the MS 200. Thus, the MS 200 will then return to the previous channel allocated by the original BTS 220 after the time period defined by the MS's 200 internal counter expires, e.g., 320 milliseconds.

Location services have a high potential for invasion of a subscriber's privacy. This is especially true when commercial applications are given the ability to access the location services. Proper authorization and access capabilities must be provided to prevent misuse and allow the subscriber to have adequate control over the ability of external parties to determine his or her location. In addition, these authorization procedures must provide adequate protection even when the subscriber is roaming.

Currently, authorization procedures exist for only a limited set of location services. These procedures do not include the ability to handle roaming subscribers, and can only be applied to services which have the ability to locate only subscribers within a certain group (Location of Subscriber within Group (LSG) services). In addition, the subscriber typically does not have ability to prevent positioning.

A previously considered solution to the problem of privacy for positioning includes a subscriber settable option disabling/enabling all application initiated location capabilities. However, this option disables all application initiated location queries, and if the subscriber chooses to enable the application initiated queries, any agency subscribing to positioning capabilities, which has the subscriber's number can position the MS at any time.

Another considered solution would permit positioning by setting an indicator on the phone. However, enabling positioning is intrusive, and there is currently no existing mechanism on MSs to enable positioning. Furthermore, it is difficult for the MS to determine when the application has finished positioning the MS (multiple positionings may be required).

Another considered solution would provide a confirmation dialog in which the subscriber must either permit or disallow the positioning request. However, this solution is also intrusive. If the user does not successfully indicate acceptance in the dialog, the positioning will not occur.

It is therefore an object of the invention to provide authorization checking of location applications prior to positioning a mobile terminal within a cellular network.

SUMMARY OF THE INVENTION

The present invention is directed to telecommunications systems and methods which perform authorization checks prior to allowing a location service to position a mobile terminal within a cellular network. The various checks involve ensuring that the requesting agency has authorization to request positioning of mobile terminals, determining whether positioning of mobile terminals is allowed within the cellular network that the mobile terminal is currently located in, verifying the authenticity of the identity of the mobile positioning center, ascertaining whether the mobile subscriber has allowed the requesting agency to position the mobile terminal, and confirming that all relevant criteria for positioning have been met by both the mobile subscriber and the requesting agency. For example, in some circumstances, an agency may only be permitted to position a mobile terminal while that mobile terminal has a call established to a specific number (or set of numbers). In that case, each agency positioning request is screened against a directory number or set of directory numbers specific to that agency. The agency requesting the positioning (taxi company, police, etc.) is interfaced with a location application, which is interfaced with a local Mobile Positioning Center (MPC). This location application will request the MPC to position a mobile terminal with a certain directory number on behalf of a given agency. The MPC will only permit the positioning to occur if that mobile terminal currently has a call established to one of the numbers associated with the given agency. Otherwise, the positioning request is rejected.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
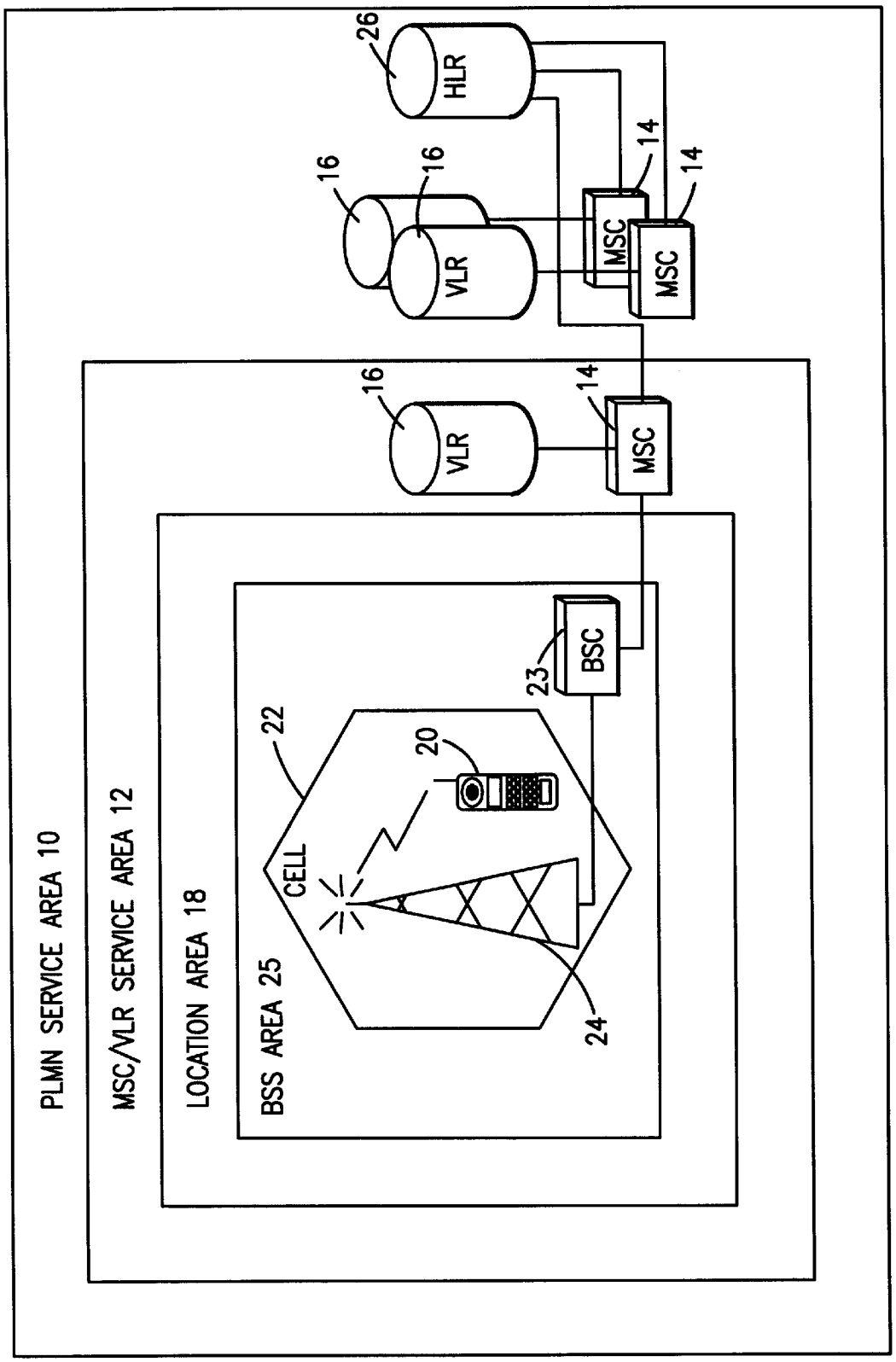
FIG. 1 is a block diagram of a conventional terrestrially-based wireless telecommunications system.
Figure 2:
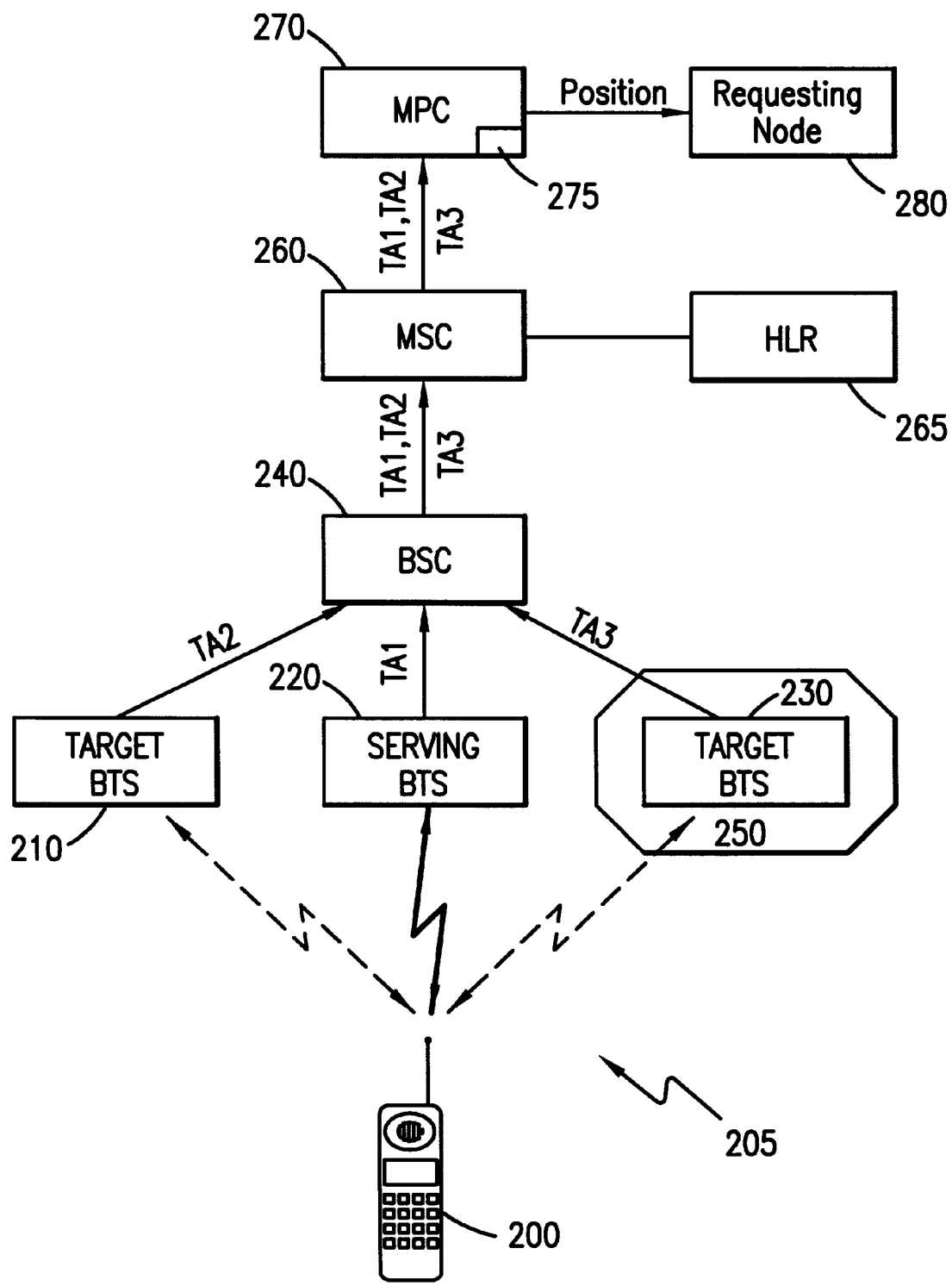
FIG. 2 illustrates a sample positioning handover in which positioning data is acquired by a target base transceiver station and transmitted to a serving base station controller.
Figure 3:
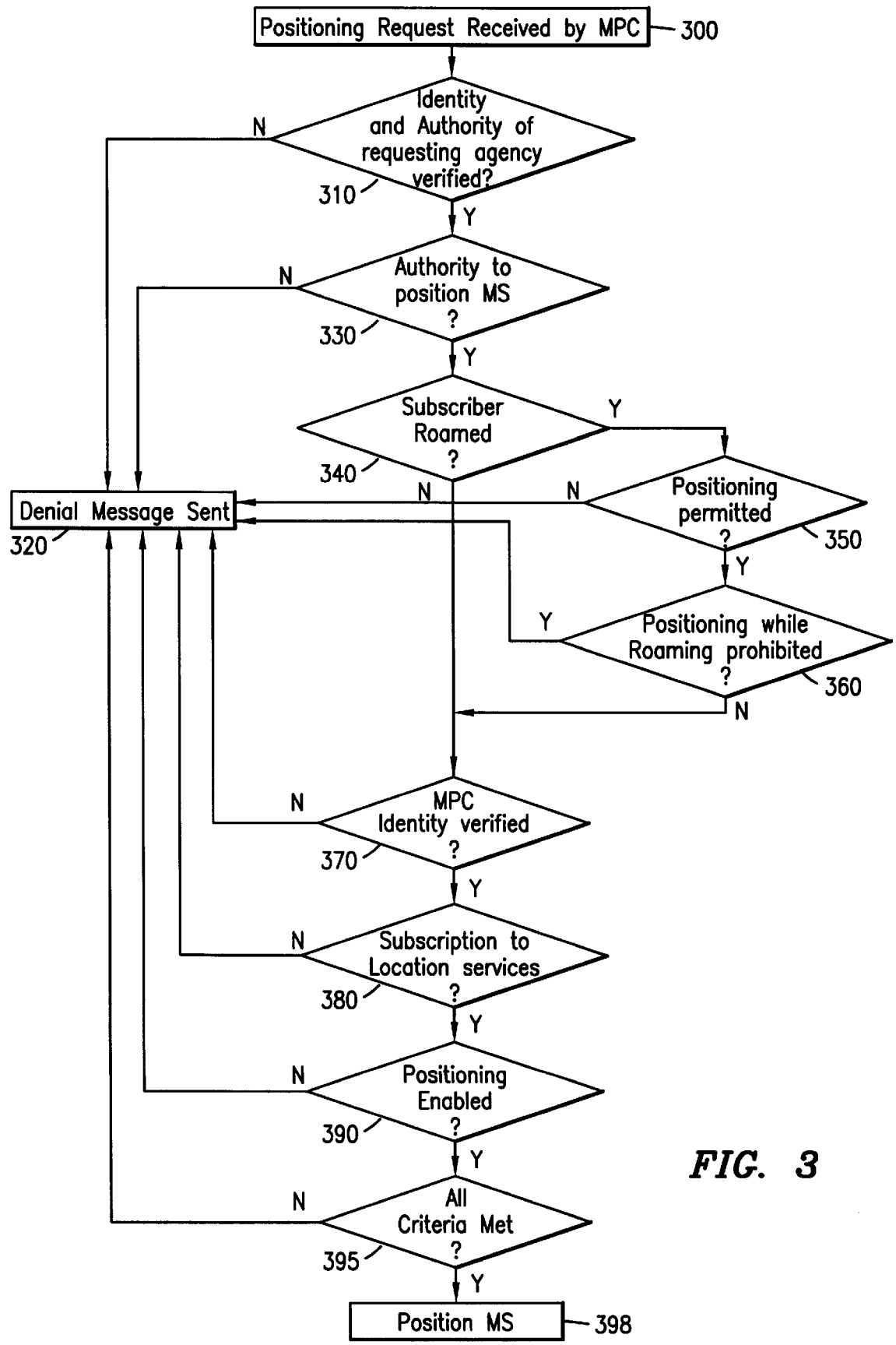
FIG. 3 demonstrates sample steps in an authorization process for positioning of a specific mobile terminal within a cellular network in accordance with preferred embodiments of the present invention.

With reference now to FIG. 3 of the drawings, steps in a sample authorization process for positioning of a specific Mobile Station (MS) 200 within a cellular network 205 are illustrated. Initially, when a positioning request is received by a local (serving) or home Mobile Positioning Center (MPC) 270 (step 300), the local or home MPC 270 must verify the identity of the requesting agency 280 and the authority of that agency 280 to request positioning (step 310). This can be accomplished by the MPC 270 cross-checking the identity of the requesting agency 280 with a list of agencies (location nodes) stored within a database 275 the MPC 270 that have the authority to position mobile stations 200. If the requesting agency 280 is not a valid agency or does not have authority to position mobile stations 200 (step 310), a message indicating that positioning is denied is sent to the requesting agency 280 (step 320). The following authorization checks, with the exception of the verification of the identity of the requesting MPC 270, can be bypassed if the requesting agency 280 is a law enforcement agency or an emergency center.

However, if the requesting agency 280 is valid and does have authority to position mobile stations (step 310), the serving MPC 270 (either home or local depending upon the current location of the MS 200) can optionally further check the authority of the requesting agency 280 to position the specific MS 200 requested (step 330). For example, if the requesting agency 280 is only permitted to position specific MSs 200 within a group of MSs 200, e.g., a taxi service connected to the home PLMN 205 can request the location of taxi mounted MSs, the membership of the specific MS 200 to the group must be confirmed. Typically, the MPC 270 verifies that the identity of the MS 200 to be positioned, e.g., the International Mobile Subscriber Identity (IMSI) number, is within a list of mobile identities allowed to be positioned by the requesting agency 280. This list could be provided by the requesting agency 280 when the requesting agency 280 registers with the home MPC 270, or could be stored in the home MPC 270. If the specific MS 200 to be positioned has roamed outside of the home Public Land Mobile Network (PLMN) 205, the serving MPC (not shown) could then request this list from the home MPC 270. If the identity of the MS 200 is not within the list of allowable mobile identities to position, a message indicating that positioning is denied can be sent to the requesting agency 280 (step 320).

If the subscriber has roamed into a new PLMN (not shown) (step 340), the serving MPC (not shown) must ascertain whether positioning of MSs 200 is permitted within the serving PLMN (not shown) (step 350). If positioning of the roaming MS 200 is not allowed (step 350), a message indicating positioning is denied is sent to the requesting agency 280 (step 320). Furthermore, the home MPC 270 may prohibit the serving MPC from positioning the MS 200 when the MS 200 has roamed. The serving MSC/VLR (not shown) must ascertain whether positioning of the MS 200 is restricted when the MS 200 is roaming (step 360), e.g., by querying the HLR 265, and if positioning is restricted (step 360), a denial message must be sent to the requesting agency 280 (step 320). Alternatively, all information regarding positioning can be sent to the serving MSC/VLR when a location update is performed by the MS 200.

If positioning of the MS 200 is allowed in the serving PLMN (step 350 and 360), the serving MSC/VLR must further verify the identity of the requesting MPC 270 (step 370) by determining the identity of the home MPC 270, e.g., by querying the Home Location Register (HLR) 265 or by checking the subscriber record sent by the HLR 265 to the serving MSC/VLR when a location update was performed, and cross-checking that identity with the identity of the requesting MPC 270. If the requesting MPC 270 is not the home MPC 270 (step 370), a denial message is sent to the requesting agency 280 (step 320).

Thereafter, the serving or home MSC/VLR 260 checks the subscriber record obtained from the HLR 265 to ensure that the subscriber associated with the MS 200 to be positioned has subscribed to the positioning service offered by the requesting agency 280 (step 380) and that the subscriber has enabled the positioning by the requesting agency 280 (step 390). For example, a requesting agency 280 could provide location services for MS-requested positioning. In that case, the serving or home MSC/VLR 260 must determine whether the subscriber has subscribed to the location services provided by the requesting agency 280 (step 380) and whether the subscriber has enabled the positioning (step 390), e.g., that the request for positioning came from the MS 200. If the subscriber has not subscribed to the service or has disabled (or not activated) the service, a denial message is sent to the requesting agency 280 (step 320)

Finally, the serving or home MPC 270 must validate that all criteria for positioning has been met (step 395). If so, then the MS 200 can be positioned (step 398). For example, when an external agency 280 positions a MS 200 in order to provide a service or assist the mobile subscriber, the subscriber should be able to restrict the external agency 280 from positioning the MS 200 if the mobile subscriber does not need the service. The Location of Subscriber while Connected (LSC) service provides one way of accomplishing this. For example, the LSC service can be used by a taxi service to determine the subscriber's location and then to dispatch a taxi to that location. In addition, such LSC services are useful for wrecker company's, and emergency calls.

Such agencies 280 can only position a MS 200 while that MS 200 has a call established to a specific number (or set of numbers). Thus, the taxi company could only position mobile stations 200 that called it's number to order a taxi. Each agency's 280 positioning requests would be screened by the MPC 270 against a directory number or set of directory numbers specific to that agency 280.

Figure 4:
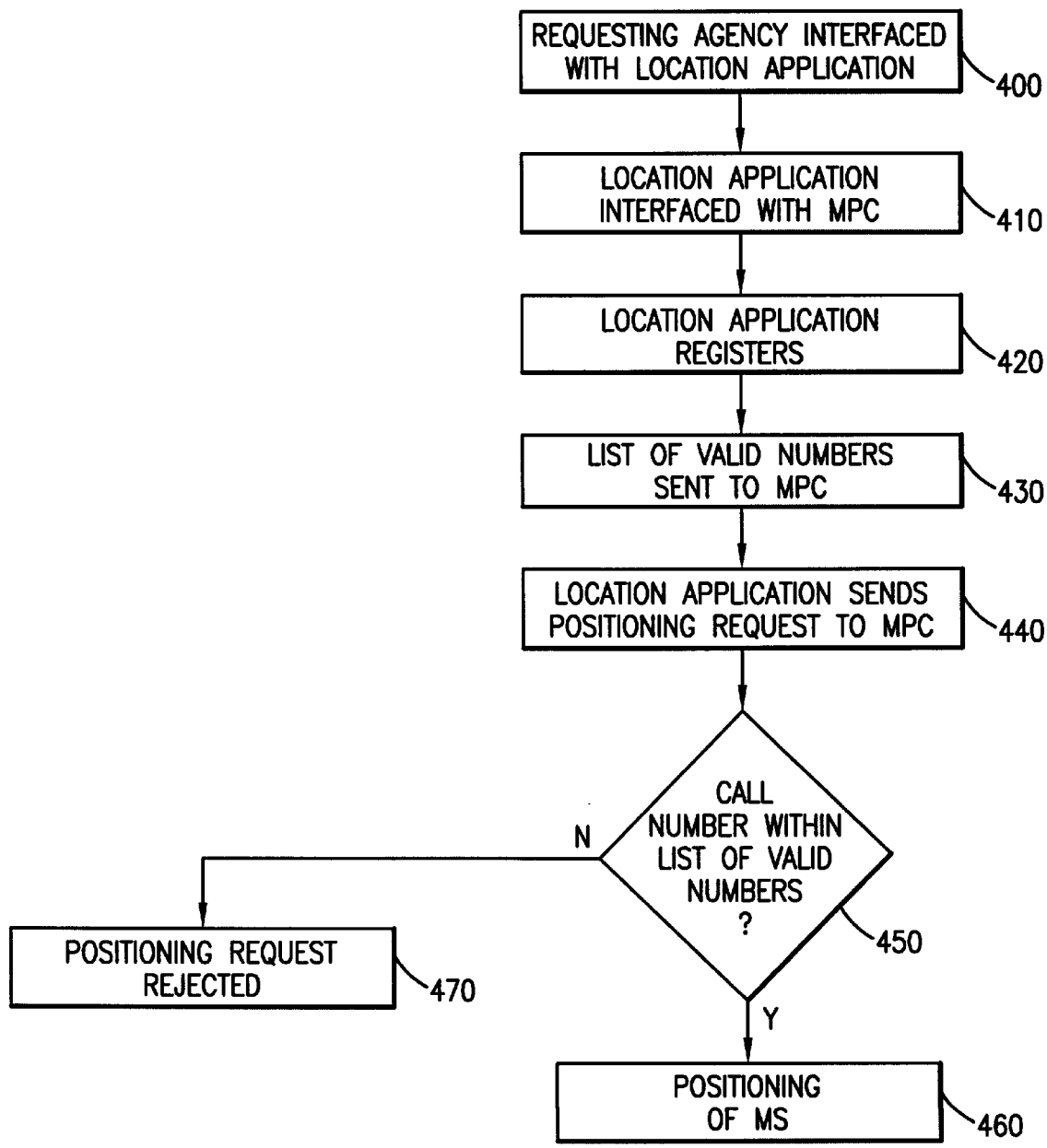
FIG. 4 describes a sample flow for validating the authority of an agency to position a mobile terminal based upon criteria to be met by both the mobile terminal and the requesting agency in accordance with preferred embodiments of the present invention.

With reference now to FIG. 4 of the drawings, a sample flow for validating the authority of an agency 280 to position a mobile station (MS) 200 based upon criteria to be met by both the MS 200 and the requesting agency 280 is depicted. The agency requesting the positioning (taxi company, police, etc.) will be interfacing with a location application 280 (step 400), which is interfaced with a local Mobile Positioning Center (MPC) 270 (step 410). The set of directory numbers valid for the agency represented by that application 280 is communicated to the MPC 270 (step 430) when the location application 280 registers with the MPC 270 (step 420). This application 280 will request the MPC 270 to position a MS 200 with a certain directory number on behalf of agency xxx (step 440). The MPC 270 will only permit the positioning to occur (step 460) if that MS 200 currently has a call established to one of the numbers associated with agency xxx (step 450). Otherwise, the positioning request is rejected (step 470).

Figure 5:
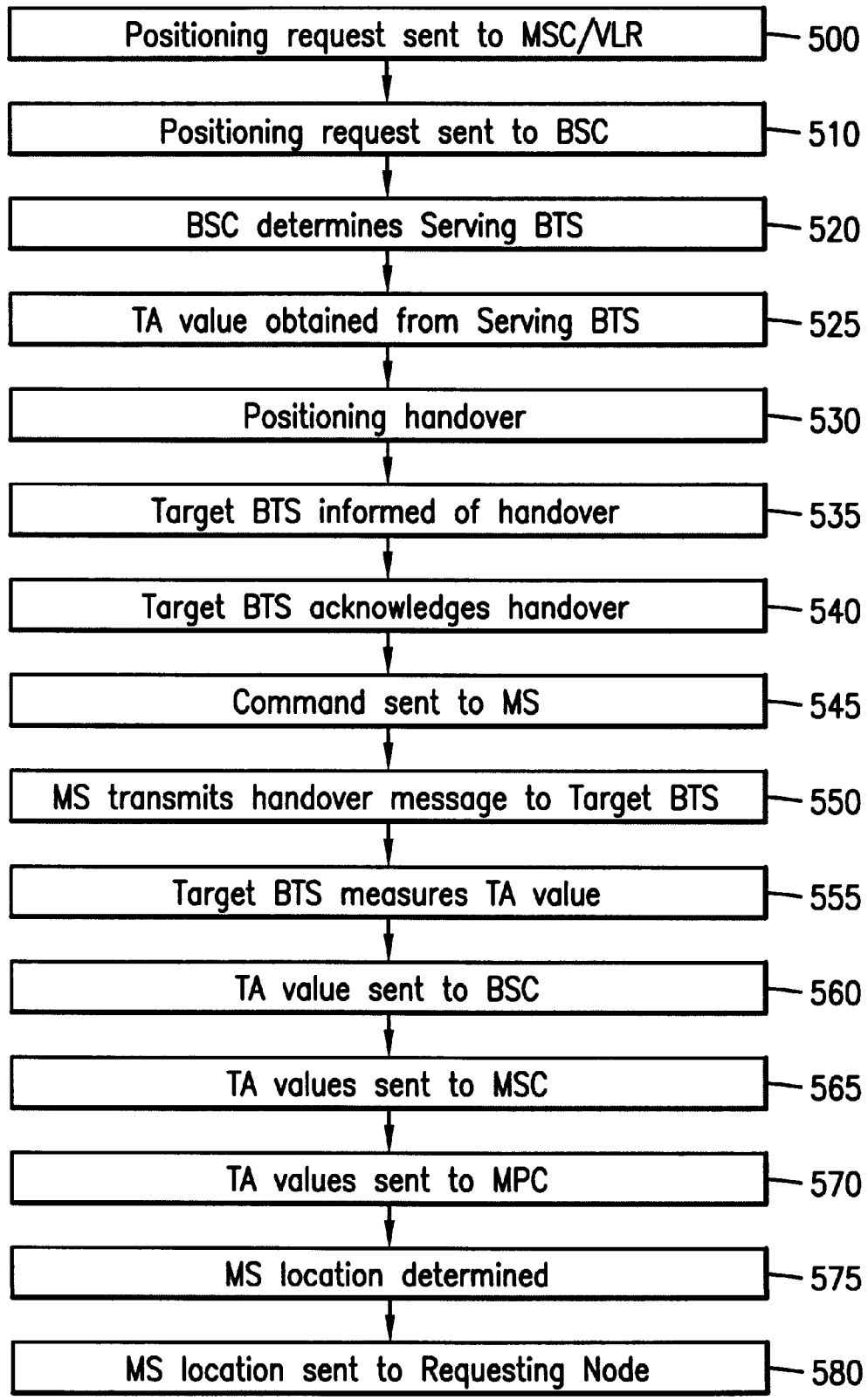
FIG. 5 depicts steps in a sample positioning process after authorization for positioning has been obtained in accordance with preferred embodiments of the present invention.

With reference now to FIG. 5 of the drawings, after the authorization of the requesting agency to position the MS has been confirmed, positioning of the MS 200 continues with the MPC 270 forwarding the positioning request to the serving Mobile Switching Center/Visitor Location Register 260 (step 500). The MPC 270 can be located within the MSC/VLR 260, or could be a separate node in communication with the MSC/VLR 260. The serving MSC/VLR 260 then forwards the positioning request to the BSC 240 (step 510). If the MS 200 is in idle mode (not in use), the MSC/VLR 260 must page the MS 200 and set up a call to the MS 200 prior to forwarding the positioning request to the BSC 240 (step 510). This call does not activate the ringing tone on the MS 200, and therefore, is not noticed by the MS 200.

The originating BSC 240 then determines which Base Transceiver Station (BTS) 220 is currently serving the MS 200 (step 520), and obtains a Timing Advance (TA) value (TA1), or other positioning data, from this serving BTS 220 (step 525), if possible. Thereafter, TA values are obtained from two target BTSs (210 and 230) (step 560) by performing a positioning handover (step 530). If the serving BTS 220 does not support positioning, an additional target BTS (not shown) must be selected. It should be noted that other positioning methods based on triangulation can be used instead of obtaining TA values, as discussed herein. In addition, positioning of the MS 200 can be performed using more than three BTSs (210, 220, and 230).

The positioning handover to one of the target BTSs 230 (step 530) is accomplished by the serving BSC 240 sending a new ACTIVATION TYPE in a CHANNEL ACTIVATION message to the target BTS 230, which informs the target BTS 230 that a positioning handover needs to be performed (step 535). The target BTS 230 then acknowledges the CHANNEL ACTIVATION message to the serving BSC 250 (step 540).

Thereafter, the BSC 240 sends a command to the MS 200 via the serving BTS 220 (step 545) to transmit a HANDOVER ACCESS message to the target BTS 230 (step 550). During the time that the MS 200 is waiting for a response from the target BTS 230, e.g., around 320 milliseconds, the target BTS 230 measures the Timing Advance value (access delay) (TA3) (step 555), using access bursts sent by the MS 200, and forwards this positioning data to the serving BSC 240 (step 560). A positioning handover can then be performed to the other target BTS 210 in the same manner as stated hereinbefore. The TA value measured by the target BTS 230 (TA3) is then transmitted by the serving BSC 250 to the MSC 260 (step 565), together with TA values (TA1 and TA2) obtained from the serving BTS 220 and other target BTSs 210.

Finally, the TA value acquired from the target BTS 230 (TA3), together with other TA values (TA1 and TA2) are forwarded to the Mobile Positioning Center (MPC) 270 from the MSC 260 (step 570), where the location of the MS 200 is determined using the triangulation algorithm (step 575). The MPC 270 then presents the geographical position of the MS 200 to the requesting agency (node) 280 (step 580).

As will be recognized by those skilled in the art, the innovative concepts described in the present application can be modified and varied over a tremendous range of applications. Accordingly, the scope of patented subject matter should not be limited to any of the specific exemplary teachings discussed.

What is claimed is:

1. A telecommunications system for authorizing positioning of a given one of a plurality of mobile stations associated with a home network when said given mobile station is roaming in a visiting network, said telecommunications system comprising:

a serving mobile switching center within said visiting network, said serving mobile switching center being in wireless communication with said given mobile station; and a serving mobile positioning center in communication with said serving mobile switching center, said serving mobile positioning center being adapted to deny positioning of said given mobile station within said visiting network in response to a determination that positioning of any of said plurality of mobile stations is prohibited within said visiting network.

2. The telecommunications system of claim 1, further comprising:

a node adapted to receive a positioning request for said given mobile station and transmit positioning request to said serving mobile switching center.

3. The telecommunications system of claim 2, wherein said node has an identity associated therewith, said identity and said positioning request being sent to said mobile switching center.

4. The telecommunications system of claim 3, further comprising:

a home mobile positioning center within said home network, said home mobile positioning center having an identity associated therewith; and a home location register within said home network adapted to store said identity of said home mobile positioning center;

wherein said serving mobile switching center is adapted to obtain said identity of said home mobile positioning center from said home location register, compare said identity of said home mobile positioning center with request, and reject said positioning request when said identity of said home mobile positioning center does not match said identity of said node.

5. The telecommunications system of claim 4, further comprising:

a requesting node adapted to send said positioning request to said node;

wherein said serving mobile switching center is adapted to transmit a denial message to said requesting node when said positioning request is rejected.

6. The telecommunications system of claim 1, wherein said serving mobile switching center is adapted to deny positioning of said given mobile station within said visiting network in response to a determination that said home network prohibits positioning of said given mobile station within said visiting network.

7. The telecommunications system of claim 6, further comprising:

a home location register within said home network adapted to store data associated with said given mobile station;

wherein said serving mobile switching is adapted to obtain said data from said home location register and use said data to make said determination that said home network prohibits positioning of said given mobile station within said visiting network.

8. A method for authorizing positioning of a given one of a plurality of mobile stations associated with a home network when said given mobile station is roaming in a visiting network, said method comprising the steps of:

receiving a positioning request for said given mobile station at a serving mobile switching center within said visiting network and in wireless communication with said given mobile station;

determining whether positioning of any of said plurality of mobile stations is allowed within said visiting network; and if not, rejecting said positioning request.

9. The method of claim 8, wherein said step of receiving further comprises the step of:

receiving said positioning request at a node having an identity associated therewith; and transmitting said positioning request and said identity to said mobile switching center.

10. The method of claim 9, further comprising the steps of:

receiving an identity associated with a home mobile positioning center within said home network at said mobile switching center;

comparing said identity associated with said home mobile positioning center with said identity of said node; and rejecting said positioning request when said identity associated with said home mobile positioning center does not match said identity associated with said node.

11. The method of claim 10, wherein said step of receiving said positioning request further comprises the step of:

transmitting said positioning request from a requesting node to said node.

12. The method of claim 11, wherein either of said steps of rejecting further comprises the step of:

sending a denial message from said mobile switching center to said requesting node.

13. The method of claim 8, further comprising the steps of:

determining whether said home network prohibits positioning of said mobile station within said visiting network; and if so, rejecting said positioning request.

14. The method of claim 13, wherein said step of determining whether said home network prohibits positioning of said mobile station within said visiting network further comprises the steps of:

receiving data associated with said mobile station at said mobile switching center; and using said data to determine whether said home network prohibits positioning of said mobile station in said visiting network.

15. A telecommunications system for determining whether positioning of a mobile station associated with a home network is allowed when said mobile station is roaming within a visiting network, said telecommunications system comprising:

a serving mobile switching center within said visiting network, said serving mobile switching center being in wireless communication with said mobile station and being adapted to deny positioning of said mobile station in response to a determination that said home network prohibits positioning of said mobile station within said visiting network.

16. The telecommunications system of claim 15, further comprising:

a home location register within said home network adapted to store data associated with said mobile station;

wherein said serving mobile switching center is adapted to obtain said data from said home location register and use said data to make said determination.

17. The telecommunications system of claim 16, further comprising:

a node having an identity associated therewith, said node being adapted to receive a positioning request for said mobile station and send said positioning request and said identity to said serving mobile switching center.

18. The telecommunications system of claim 17, further comprising:

a home mobile positioning center within said home network, said home mobile positioning center having an identity associated therewith;

wherein said home location register is adapted to store said identity of said home mobile positioning center and transmit said identity of said home mobile positioning center to said serving mobile switching center; and wherein said serving mobile switching center is adapted to reject said positioning request when said identity associated with said home mobile positioning center does not match said identity of said node.

19. A telecommunications system for determining whether positioning of a mobile station is allowed, said telecommunications system comprising:

a requesting node having at least one directory number associated therewith, said requesting node being adapted to send a positioning request for said mobile station; and a mobile positioning center in communication with said requesting node to receive said positioning request, said mobile positioning center being adapted to store said at least one directory number for said requesting node and reject said positioning request in response to a determination that said mobile station does not have a call connection established towards one of said at least one directory number of said requesting node when said positioning request is received.

20. A method for determining whether positioning of a mobile station within a telecommunications system is allowed, said method comprising the steps of:

sending a positioning request for said mobile station from a requesting node having at least one directory number associated therewith to a mobile positioning center;

determining whether said mobile station has a call connection established towards one of said at least one directory number; and if not, rejecting said positioning request.

* * * * *